(12) United States Patent
Paruchuri et al.

(10) Patent No.: US 10,655,472 B2
(45) Date of Patent: May 19, 2020

(54) AEROFOIL WITH LEADING EDGE SLITS

(71) Applicant: ROLLS-ROYCE PLC, London (GB)

(72) Inventors: Chaitanya Paruchuri, Southampton (GB); Philip Joseph, Southampton (GB)

(73) Assignee: ROLLS-ROYCE plc, London (GB)

(*) Notice: Subject to any disclaimer, the term of this patent is extended or adjusted under 35 U.S.C. 154(b) by 188 days.

(21) Appl. No.: 16/149,278

(22) Filed: Oct. 2, 2018

(65) Prior Publication Data

US 2019/0128123 A1 May 2, 2019

(30) Foreign Application Priority Data

Nov. 1, 2017 (GB) .................................... 1718069.6

(51) Int. Cl.
*F01D 5/14* (2006.01)
*B64C 3/14* (2006.01)
(Continued)

(52) U.S. Cl.
CPC ............... *F01D 5/146* (2013.01); *B63H 1/26* (2013.01); *B64C 3/10* (2013.01); *B64C 3/14* (2013.01);
(Continued)

(58) Field of Classification Search
CPC ... F01D 5/00; F01D 5/26; F01D 5/146; F01D 5/141; F01D 5/16; F01D 9/041;
(Continued)

(56) References Cited

U.S. PATENT DOCUMENTS

| 1,724,456 A * | 8/1929 | Crook .................... B64C 9/146 |
| | | 244/203 |
| 2,358,985 A * | 9/1944 | McAndrew ............... B64C 3/54 |
| | | 244/201 |

(Continued)

FOREIGN PATENT DOCUMENTS

| CN | 105626159 A | 6/2016 |
| EP | 2003340 A2 | 12/2008 |

(Continued)

OTHER PUBLICATIONS

Chaitanya, P.; Narayanan, S.; Joseph, P.; Kim, J. W.; "Leading edge serration geometries for significantly enhanced leading edge noise reductions", Jun. 2016, 2nd AIAA/CEAS Aeroacoustics Conference (Year: 2016).*

(Continued)

*Primary Examiner* — Nathaniel E Wiehe
*Assistant Examiner* — Eric A Lange
(74) *Attorney, Agent, or Firm* — Oliff PLC

(57) ABSTRACT

An aerofoil having a leading edge and a trailing edge, the leading edge including a plurality of slits extending toward the trailing edge, such that the leading edge is defined by alternating peaks and troughs. Each peak extends in a generally spanwise direction and defines a peak width, each peak being separated from an adjacent peak in the spanwise direction by a trough. Each trough extends in the generally spanwise direction and is spaced in a chordwise direction from the peak, each trough defining a trough width. A ratio of the peak width to the trough width is between 4:1 and 10:1.

14 Claims, 6 Drawing Sheets

(51) Int. Cl.
*B64C 3/10* (2006.01)
*B64C 11/18* (2006.01)
*B63H 1/26* (2006.01)
*F01D 5/16* (2006.01)
*F01D 9/04* (2006.01)

(52) U.S. Cl.
CPC .............. *B64C 11/18* (2013.01); *F01D 5/141* (2013.01); *F01D 5/16* (2013.01); *F01D 9/041* (2013.01); *F05D 2240/121* (2013.01); *F05D 2250/182* (2013.01); *F05D 2260/96* (2013.01)

(58) Field of Classification Search
CPC .... F01D 25/04; F01D 25/06; F05D 2240/121; F05D 2250/182; F05D 2260/96; B64C 3/10; B64H 1/26
See application file for complete search history.

(56) References Cited

U.S. PATENT DOCUMENTS

| | | | |
|---|---|---|---|
| 6,431,498 | B1 | 8/2002 | Watts et al. |
| 6,733,240 | B2* | 5/2004 | Gliebe .................... F01D 5/141 416/228 |
| 2003/0175121 | A1* | 9/2003 | Shibata ................. F03D 1/0641 416/131 |
| 2011/0058955 | A1 | 3/2011 | Jung et al. |
| 2011/0142637 | A1* | 6/2011 | Riddell ................. F03D 1/0633 416/62 |
| 2012/0061522 | A1 | 3/2012 | Sullivan et al. |
| 2013/0164488 | A1 | 6/2013 | Wood et al. |
| 2013/0224037 | A1 | 8/2013 | Simpson et al. |
| 2014/0301860 | A1* | 10/2014 | Ramm .................... F01D 5/145 416/231 R |
| 2018/0023403 | A1 | 1/2018 | Jones et al. |

FOREIGN PATENT DOCUMENTS

| | | | |
|---|---|---|---|
| EP | 2031244 | A1 | 3/2009 |
| EP | 3208420 | A1 | 8/2017 |
| GB | 1052328 | A | 12/1966 |
| GB | 2497739 | A * | 6/2013 |
| GB | 2497739 | A | 6/2013 |

OTHER PUBLICATIONS

Gruber, Mathieu; Phillip F, Joseph; Azarpeyvand, Mandi; "An experimental investigation of novel trailing edge geometries on airfoil trailing edge noise reduction", May 2013, AIAA/CEAS Aeroacoustics Conference (Year: 2013).*

Mar. 29, 2019 Search Report issued in European Patent Application No. 18198009.5.

Apr. 6, 2018 Search Report issued in British Patent Application No. 1718069.6.

* cited by examiner

AEROFOIL WITH LEADING EDGE SLITS

BACKGROUND

The present disclosure concerns an aerofoil, particularly but not exclusively, an aerofoil for a gas turbine engine having a reduced broadband noise profile in use.

Noise from aircraft is an ongoing environmental concern. There are typically several sources of noise from an aircraft, including jet noise produced by shear interaction between the jet exhaust from gas turbine engines, and aerodynamic noise caused primarily by turbulent air created by the flow of air over aircraft surfaces. One particular source of noise is due to interaction between a wake resulting from an upstream component such as a fan or propeller rotor impinging on the leading edge of a downstream component such as an Outlet Guide Vane (OGV).

As aircraft engine bypass ratios are increased, aircraft aerodynamic noise is becoming a relatively large contributor to overall aircraft noise. In particular, turbulence created on the leading and trailing edges of aerofoil surfaces is thought to produce a significant proportion of noise produced by an aircraft. Noise created by these mechanisms often has a wide range of frequencies (known as "broadband noise"), and is particularly difficult to eliminate.

Examples of aerofoils on aircraft include the wings and tail surfaces, as well as smaller components such as control surfaces and high lift devices such as flaps and slats. The gas turbine engines of the aircraft also typically include several aerofoils, including compressor and turbine rotors and stators, fan rotors and Outlet Guide Vanes (OGV). The gas turbine engine nacelle is also typically aerofoil shaped.

It has been proposed to provide wave-like projections on the leading edge of an aerofoil, as proposed for example in U.S. Pat. No. 6,431,498. It is thought that such projections reduce drag as well as reduce noise to some extent, as evidenced for example in US2013164488. Such projections have been proposed for both fixed and rotating aerofoils, as proposed for example in US2011058955.

However, such projections do not eliminate noise completely, and it is therefore desirable to provide an aerofoil having improved noise attenuation properties. Furthermore, these profiles may be relatively time consuming and expensive to produce, and may have relatively poor aerodynamic performance (i.e. high drag).

The term "chord" will be understood to refer to the distance between the leading and trailing edge of an aerofoil, measured parallel to the normal in use airflow over the wing. The term "chordwise" will be understood to refer to a direction parallel to the chord. The term "span" will be understood to refer to a direction generally normal to the chord, extending between a root and a tip of an aerofoil component. The term "spanwise" will be understood to refer to a direction parallel to the span.

SUMMARY

According to a first aspect of the disclosure there is provided an aerofoil having a leading edge and a trailing edge, the leading edge comprising a plurality of slits extending toward the trailing edge, such that the leading edge is defined by alternating peaks and troughs;

each peak defining a peak width extending in a generally spanwise direction, each peak being separated from an adjacent peak in the spanwise direction by a trough;

each trough being spaced in a chordwise direction from the peak, each trough defining a trough width extending in the spanwise direction;

wherein a ratio of the peak width to the trough width is between 4:1 and 10:1.

Advantageously, it has been found that the disclosed aerofoil leading edge profile provides reduce broadband noise for a given slit height when in use compared to prior arrangements, thereby allowing for either reduced noise, or reduced drag for a given slit height. The slits are relatively narrow in comparison to prior arrangements, and so represent a relatively small modification to the leading edge. This may reduce cost of manufacture, and reduce the aerodynamic impact of the slits.

Each slit may comprise a generally chordwise extending side surface provided at each end of each peak, interconnecting each peak with an adjacent trough.

Each peak may define a generally spanwise extending end surface.

Each side surface may extend orthogonally to each end surface.

Alternatively, each side surface may comprise a convex curve extending in a generally chordwise direction.

Each trough may comprise a generally concave curve extending in a generally spanwise direction.

Opposing side surfaces of each slit may be angled inwardly toward one another in a downstream direction.

The peaks may extend in a line parallel to the spanwise direction. The troughs may extend in a line parallel to the spanwise direction.

The trough width may be greater than or equal to 1 mm.

The aerofoil may comprise an aerofoil of a gas turbine engine, such as an outlet guide vane (OGV).

According to a second aspect of the present disclosure there is provided a gas turbine engine comprising an aerofoil in accordance with the first aspect of the present disclosure.

According to a third aspect of the present disclosure there is provided an aircraft comprising an aerofoil in accordance with the first aspect of the present disclosure.

The skilled person will appreciate that except where mutually exclusive, a feature described in relation to any one of the above aspects of the invention may be applied mutatis mutandis to any other aspect of the invention.

BRIEF SUMMARY OF THE INVENTION

Embodiments of the invention will now be described by way of example only, with reference to the Figures (which are not to scale), in which.

DETAILED DESCRIPTION

Figure 1:
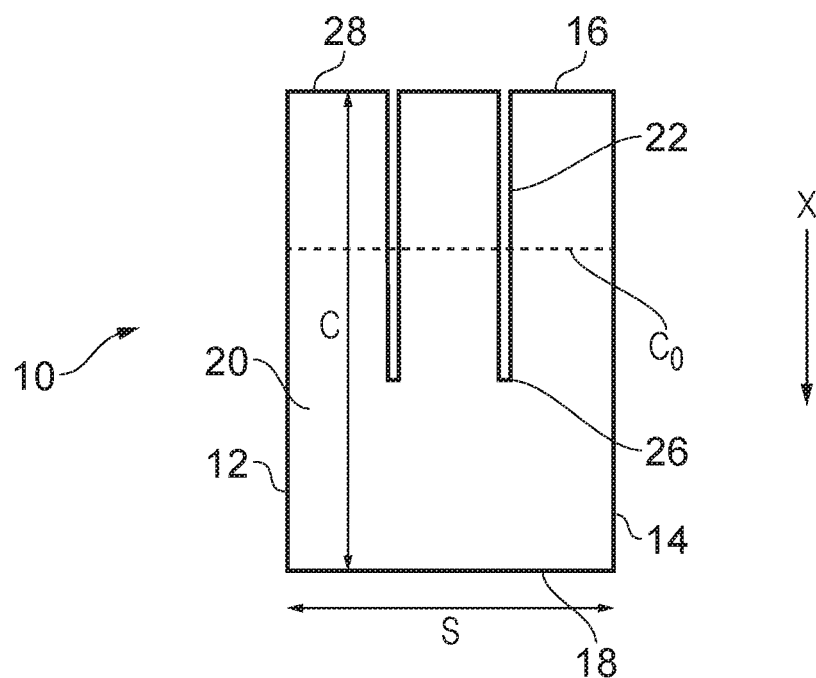
FIG. 1 is a schematic plan view of a first aerofoil in accordance with the present disclosure.

FIG. 1 shows a first aerofoil 10 in accordance with the present disclosure. The aerofoil 10 defines a root 12, a tip 14, a leading edge 16, a trailing edge 18, a suction surface 20 and a pressure surface (not shown) on the opposite side to the suction surface 20. The aerofoil 10 defines a mean chord line $C_0$ defined by a line extending from the root 12 to the tip 14 of the aerofoil 10 along the arithmetic mean of the chordal position of the leading edge 16 of the aerofoil 10. The aerofoil 10 defines an in use flow direction X extending in a direction from the leading edge 16 to the trailing edge 18. A distance between the leading and trailing edges 16, 18 defines a chord C, while a distance between the root and tip 12, 14 defines a span S.

Figure 2:
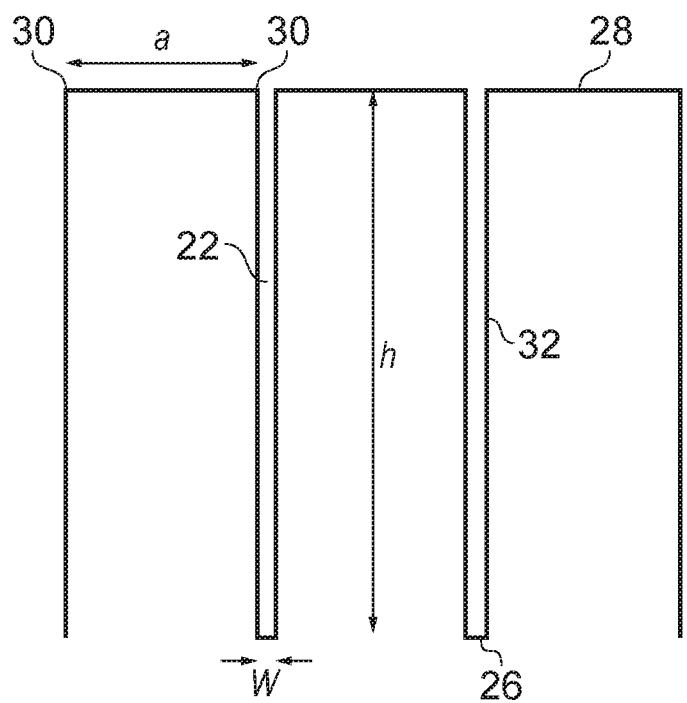
FIG. 2 is a schematic plan view of a leading edge of the aerofoil of FIG. 1.

The leading edge 16 of the aerofoil 10 defines a profile when viewed from either the suction surface 20 or pressure surface of the aerofoil 10. This profile is shown in further detail in FIG. 2, which shows the leading edge 16 of the aerofoil 10.

The leading edge 16 profile includes a plurality of slits 22, which extend in a generally spanwise direction toward the trailing edge 18. Each slit 22 comprises a cut-out in the leading edge 16 of the aerofoil 10, which extends through the aerofoil from the suction surface 20 to the pressure surface. Each slit 22 extends from an upstream end defined by a peak 28 to a downstream end defined by a trough 26. Adjacent peaks 28 are provided at the same chordal extent, such that the peaks 28 form a straight line extending in a spanwise direction S. Similarly, the troughs 26 are provided at the same chordal extent, such that the troughs 26 similarly form a straight line extending in a spanwise direction S. However, the peaks 28 and troughs 26 are separated in a chordal direction by a distance h.

Each peak 28 comprises a generally spanwise extending forward end surface 28, which defines a spanwise extent a. Ends 30 of each peak 28 are connected to generally chordwise extending side surfaces 32, which in this embodiment extend orthogonally to the forward end surfaces 28, toward the trailing edge 18, such that a 90° corner is defined by the side surfaces 32 and end surface 28. Each side surface 32 is in turn connected to a generally spanwise extending interconnecting portion surface which defines the trough 26, which interconnects adjacent side surfaces 32. Each trough 26 similar defines a spanwise extend w at the point furthest from the peaks 28.

As discussed, a slit height h is defined by a chordwise distance between the peaks 28 and the troughs 26. Typically, the waveform height is approximately 7 to 10% of the mean chord length $C_0$.

Figure 3:
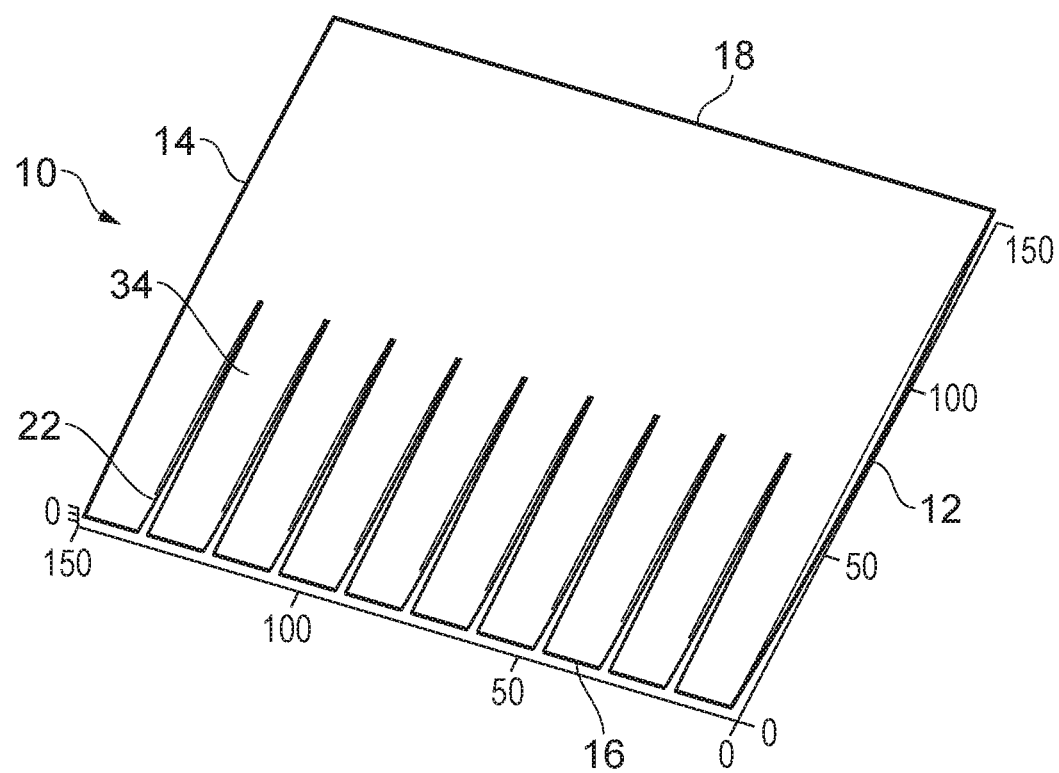
FIG. 3 is a perspective view from a leading edge of the aerofoil of FIG. 1.
Figure 6:
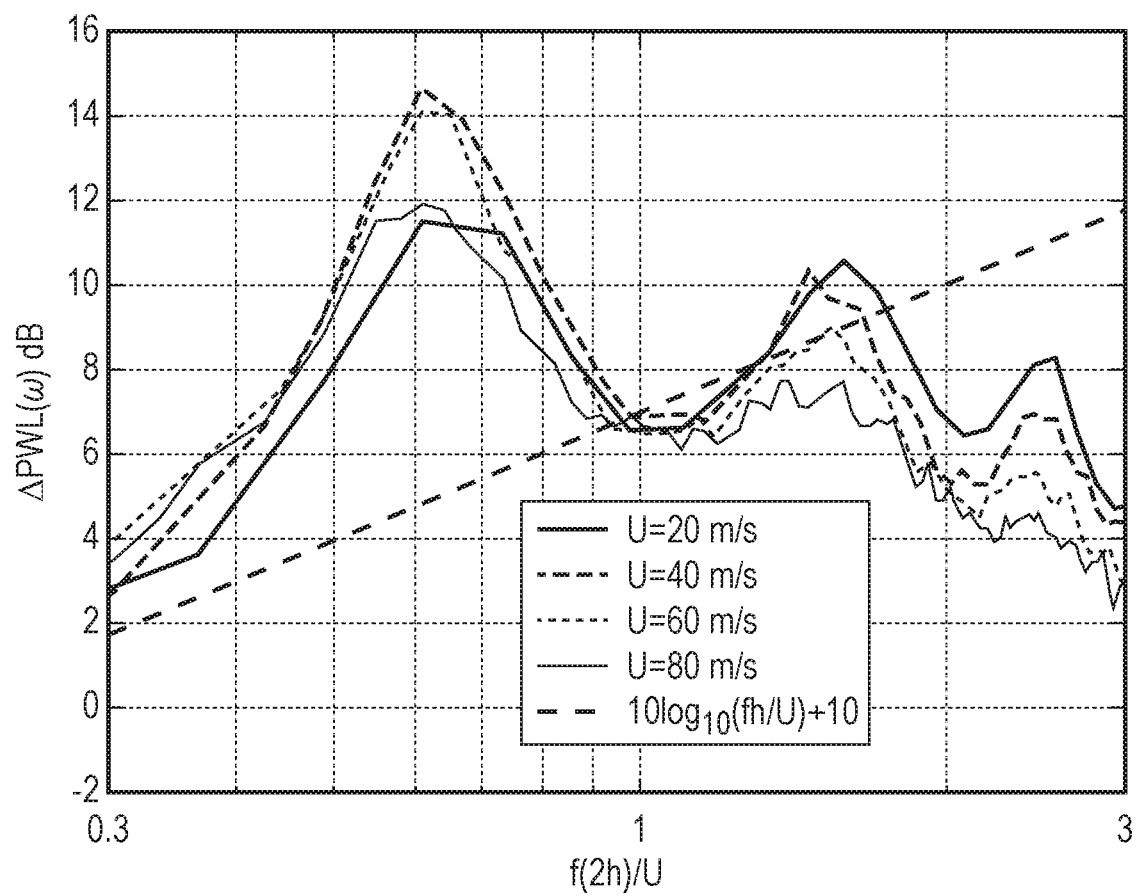
FIG. 6 is a graph comparing noise reduction of a flat-plate aerofoil having a profile in accordance with the present disclosure at different airflow speeds.

The described aerofoil leading edge is applicable to both flat plate (i.e. generally planar) surfaces, in which both the suction and pressure surfaces are flat, and curved, cambered aerofoils. FIG. 3 shows the leading edge of the present disclosure applied to an outlet guide vane (OGV) of a gas turbine engine 1 (a schematic sectional view of a gas turbine engine is shown in FIG. 6). The OGV 10 is shown approximately to scale. As can be seen, the depth of the slits 22 in the direction extending between the pressure and suction surfaces increases in a chordwise direction C from the leading edge 16 toward the trailing edge 18.

Each trough 26 is blended into the remainder of the body of the aerofoil 10, such that a further slit 34 (which does not extend completely between the pressure and suction surfaces) is defined, which extends downstream from the trough 26. This further slot 26 has a depth in the direction extending between the suction and pressure surfaces which decreases in the downstream direction, such that the further slit 34 blends into the aerofoil 10.

In general, a ratio of the peak width divided by the trough width is between 4 and 10 inclusive. The below table 1 illustrates embodiments of the disclosed leading edge profile, on which test for noise abatement effectiveness have been conducted:

TABLE 1

| W (mm) | A (mm) | Ratio a/w |
|---|---|---|
| 0.5 | 5 | 10 |
| 1 | 10 | 10 |
| 2 | 15 | 7.5 |
| 3 | 20 | 6.66 |
| 4 | 25 | 6.25 |
| 5 | 30 | 6 |
| 10 | 40 | 4 |

Figure 4:
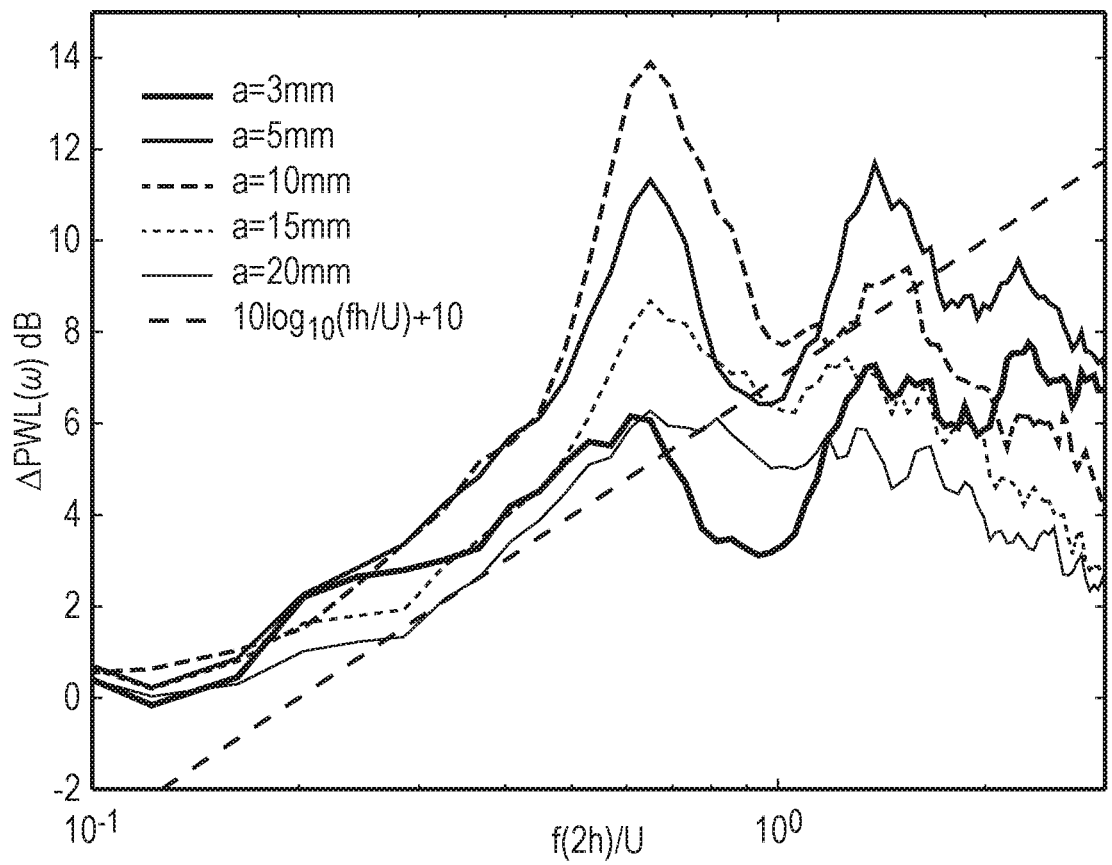
FIG. 4 is a graph showing relative reductions in sound levels of embodiments of the aerofoil of FIG. 1, in comparison to prior aerofoils, normalised for an aerofoil having a straight leading edge.

FIG. 4 shows results from experimental tests on the seven different aerofoils of table 1. FIG. 4 graphs relative reduction in noise in terms of decibels (dB) over a range of frequencies. This is normalised to a "baseline" aerofoil that is not in accordance with the aerofoils of the present disclosure, which defines the zero point of the y axis. The baseline aerofoil has a straight leading edge.

As can be seen, each of the aerofoils produce significantly less noise for a given slit height h compared to the baseline aerofoil, particular at mid-range frequencies which are particularly easily perceived by the human ear. Consequently, further noise reductions over the prior art can be achieved, or reduced slit heights, which may reduce aerodynamic losses. Furthermore, it can be seen that the ratio a/w has a large effect on noise reduction, and that a step-change improvement in noise reduction is achieved at a/w ratios between 4 and 10.

The mechanism by which the disclosed leading edge profile reduces noise is understood to be a result of the distribution of strong noise producing regions. In particular, the corners of the troughs 26 provide spatially compact noise sources. In view of their chordal spacing, these act as coherent noise sources, which serve to destructively interfere with one another.

Additionally, it has been found by the inventors that, with previous designs, it is often necessary to have relatively large amplitude serrations (i.e. slits having a large height h) in order to provide the desired noise reduction. Such large serrations may result in decreased aerodynamic performance (i.e. increased drag). The design described in the present disclosure enables relatively small amplitude serrations (small h) for a given noise reduction, and so reduced drag relative to prior designs.

Furthermore, prior designs tended to reduce noise only at specific frequencies. Since noise generated by wake interaction at the leading edge of aircraft components is often relatively broadband (having a large number of frequency components), these prior design are inadequate for effectively reducing perceived noise. In contrast, the design of the present disclosure provides extensive broadband noise reduction over a greater range of frequencies, thereby providing more effective noise reduction.

Figure 5:
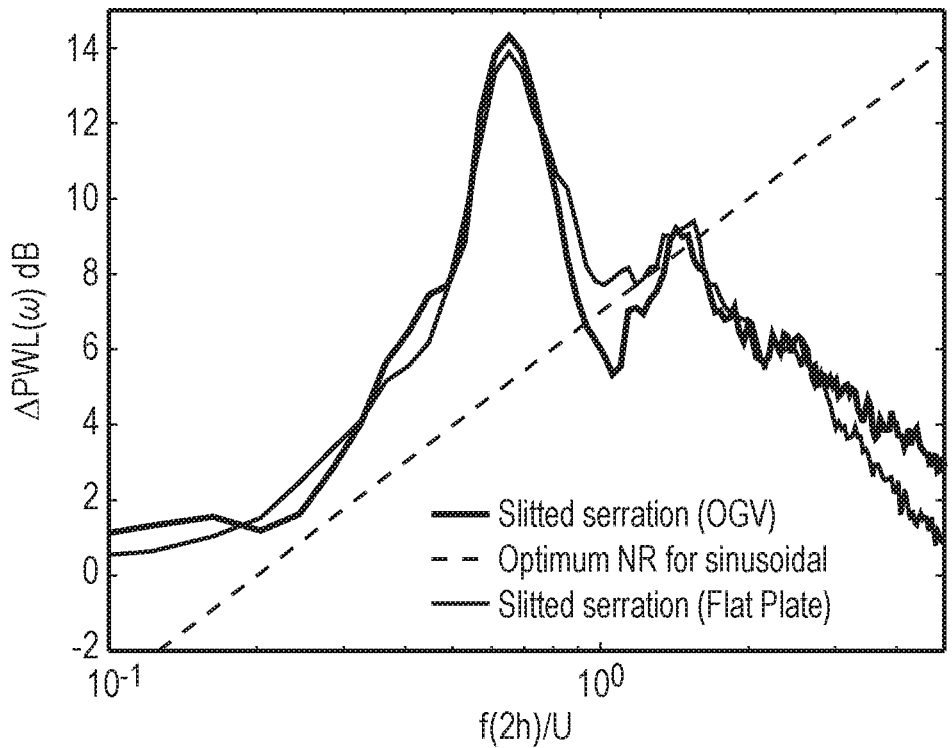
FIG. 5 is a graph comparing noise reduction of a flat-plate aerofoil, compared to an outlet guide of a gas turbine engine.

FIG. 5 shows a graph comparing similar leading edge profiles shapes applied to a flat plate, and to the OGV 10 shown in FIG. 3. As can be seen, similar results are obtained regardless of whether the disclosed leading edge profile is applied to a flat plate or a cambered aerofoil. The disclosed profile is thought to be applicable to a wide variety of leading edge aerospace structures.

FIG. 6 shows results from tests made on a flat plate having a leading edge profile in accordance with the present disclosure. As can be seen, the noise reduction is effective over a wide range of speeds, from 20 metres per second to at least 80 metres per second (which represents the limits of the available testing equipment).

Figure 7:
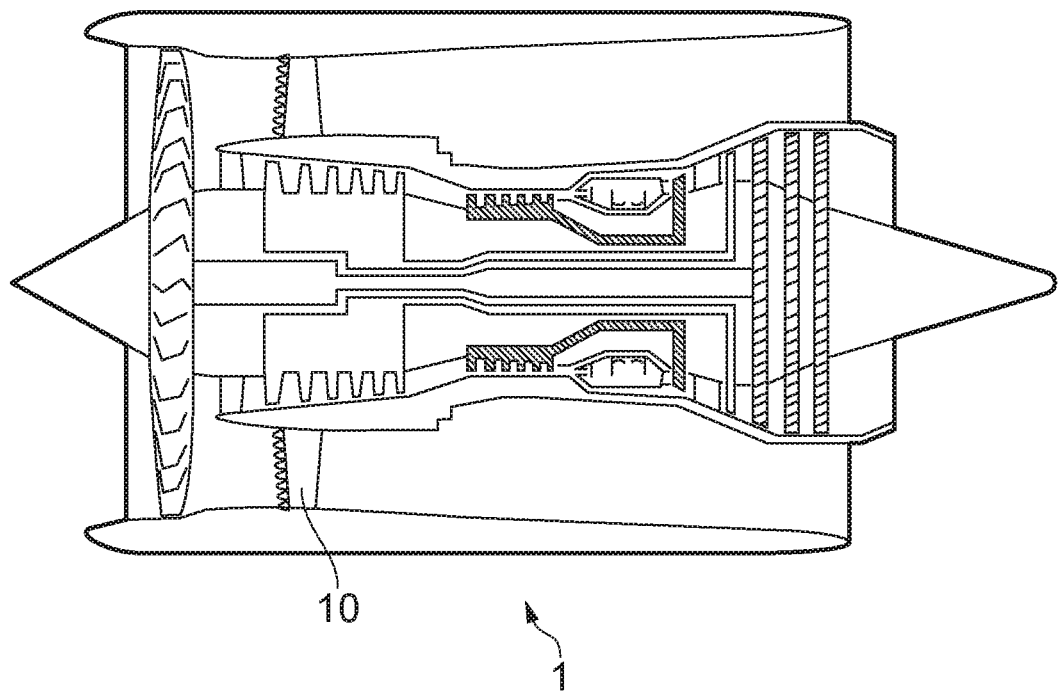
FIG. 7 is a cross sectional schematic of a gas turbine engine comprising an aerofoil in accordance with the present disclosure.

FIG. 7 shows a gas turbine engine 1 employing an aerofoil in accordance with the above disclosure. An outlet guide vane (OGV) 10 is provided, which comprises an aerofoil as shown in FIG. 1. Due to the provision of the OGV 10 having the leading edge profile in FIG. 1, noise generated by interaction of the fan efflux with the outlet guide vane 10 is reduced relative to prior arrangements.

Figure 8:
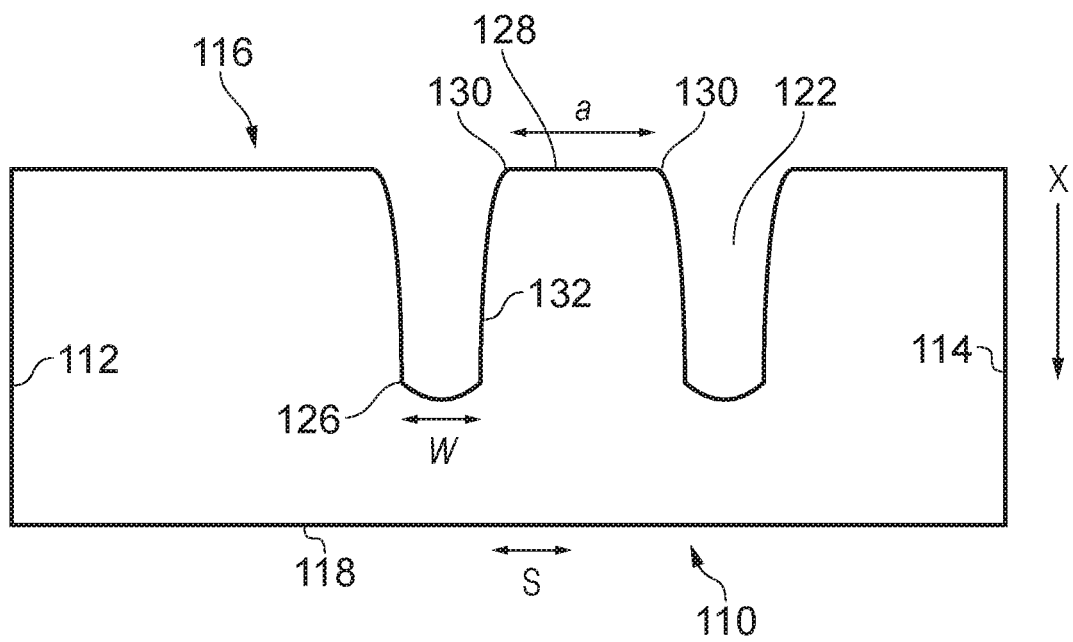
FIG. 8 is a schematic plan view of a second aerofoil in accordance with the present disclosure.

FIG. 8 shows a second embodiment of an aerofoil 110 in accordance with the present disclosure. The aerofoil 110 is similar to the aerofoil 10, except that the troughs 126 and side surface 132 differ in shape compared to the aerofoil 10.

In more detail, the aerofoil 110 comprises leading and trailing edges 116, 118, as well as a root 112 and a tip 114. The leading edge 116 comprises a plurality of spanwise separated slits 122 comprising peaks 128 and troughs 126. Again, the peaks 128 are provided at the same chordal position as each other, while the troughs 126 are also provided at the same chordal position as each other.

In this case, the troughs 126 are in the form of concave surfaces. This may provide for improved aerodynamic performance in some cases.

Similarly, the side surfaces 132 are in the form of convex surfaces. In this embodiment, the widths a of the peaks are defined by the distance between ends 130 of the front surface 128, where the front surface meets the side surfaces 132. Similarly, the widths w of the troughs is defined by the points where the side surfaces 132 meet the trough 126.

Figure 9:
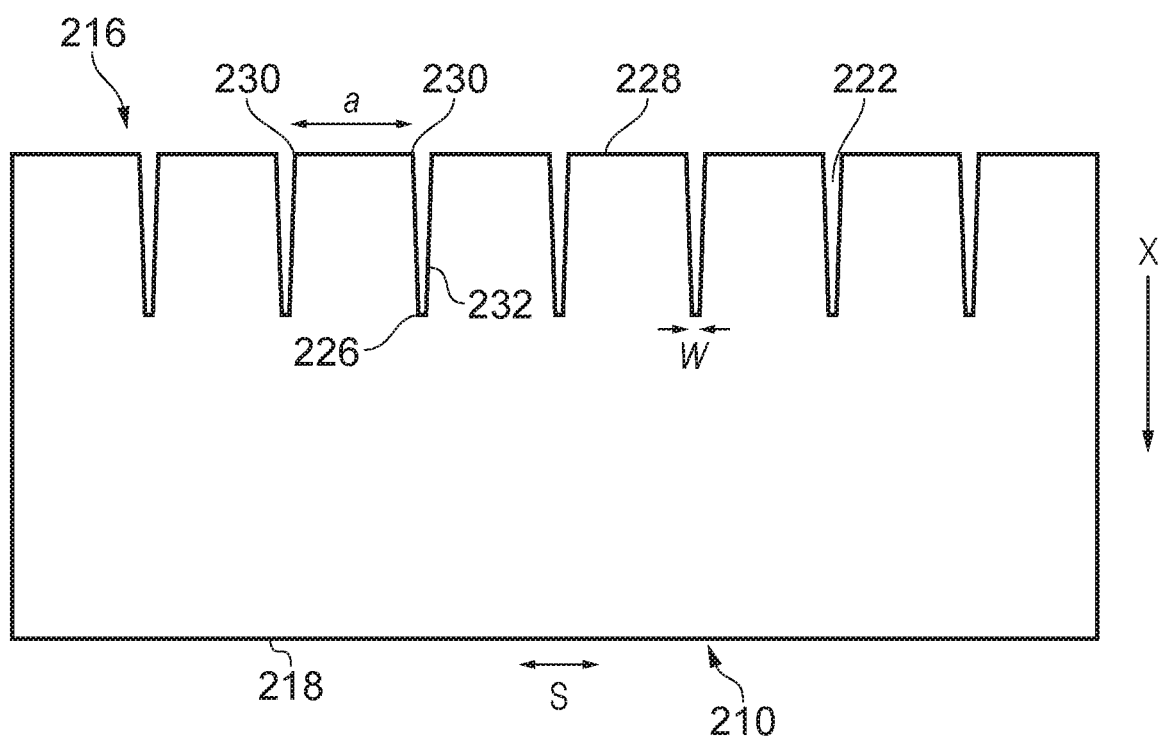
FIG. 9 is a schematic plan view of a third aerofoil in accordance with the present disclosure.

FIG. 9 shows a third embodiment of an aerofoil 210 in accordance with the present disclosure. The aerofoil 110 is similar to the aerofoils 10, 110, except that the side surfaces 232 differ in shape compared to the aerofoil 10.

In more detail, the aerofoil 210 comprises leading and trailing edges 216, 218. The leading edge 216 comprises a plurality of spanwise separated slits 222 comprising peaks 228 and troughs 226. Again, the peaks 128 are provided at the same chordal position as each other, while the troughs 126 are also provided at the same chordal position as each other, and the peaks and troughs 228, 226 are separated in the chordal direction X.

In this case, the troughs 226 are in the form of straight, spanwise extending surfaces, similar to those of the embodiment of FIG. 1. The side surfaces 232 are also in the form of straight surfaces. However, unlike the embodiment of FIG. 1, the side surfaces 232 of each slit 222 extend inwardly toward one another in the downstream direction X, such that the slits 222 narrow from a relatively wide upstream end, to a relatively narrow, downstream end. Again, widths a of the peaks 228 are defined by the distance between ends 230 of the front surface 228, where the front surface meets the side surfaces 232, and the widths w of the troughs 226 is defined by the points where the side surfaces 232 meet the trough 226.

In general, it has been found that the slits are effective for a wide variety of slit shapes. For example, slits having concave sidewalls, or side walls with more complex curves may also be effective. Of principle importance however is the ratio between peak width and slit width.

It will be understood that the disclosure is not limited to the embodiments above-described and various modifications and improvements can be made without departing from the concepts described herein. For example, the disclosure could be employed in aerofoils of different parts of a gas turbine engine, different parts of an aircraft, or in non-aviation applications, such as wind turbines, marine propellers, industrial cooling fans, and other aerofoils in which noise is a consideration. The disclosure has been found to be effective for a wide range of aerofoil cross sectional profiles, and also for flat plate aerofoils.

It will be understood that the leading edge profile may not be applied to the whole of the leading edge of the aerofoil. The profile maybe applied to swept aerofoils, in which incident flow travels in a direction which is not parallel to the chord.

Except where mutually exclusive, any of the features may be employed separately or in combination with any other features and the disclosure extends to and includes all combinations and sub-combinations of one or more features described herein.

The invention claimed is:

1. An aerofoil having a leading edge and a trailing edge, the leading edge comprising a plurality of slits extending toward the trailing edge, such that the leading edge is defined by alternating peaks and troughs;
   each peak defining a peak width extending in a generally spanwise direction, each peak being separated from an adjacent peak in the spanwise direction by a trough;
   each trough being spaced in a chordwise direction from the peak, each trough defining a trough width extending in the spanwise direction; wherein a ratio of the peak width to the trough width is between 4:1 and 10:1.

2. The aerofoil according to claim 1, wherein each slit comprises a generally chordwise extending side surface provided at each end of each peak, interconnecting each peak with an adjacent trough.

3. The aerofoil according to claim 1, wherein each peak defines a generally spanwise extending end surface.

4. The aerofoil according to claim 2,
   wherein each peak defines a generally spanwise extending end surface, and
   wherein each side surface extends orthogonally to each end surface.

5. The aerofoil according to claim 1, wherein each peak comprises a generally chevron shaped end surface.

6. The aerofoil according to claim 2, wherein each side surface comprises a convex curve extending in a generally chordwise direction.

7. The aerofoil according to claim 2, wherein opposing side surfaces of each slit are angled inwardly toward one another in a downstream direction.

8. The aerofoil according to claim 1, wherein the peaks extend in a line parallel to the spanwise direction.

9. The aerofoil according to claim 1, wherein the troughs extend in a line parallel to the spanwise direction.

10. The aerofoil according to claim 1, wherein each trough width is greater than or equal to 1 mm.

11. The aerofoil according to claim 1, wherein the aerofoil comprises an aerofoil of a gas turbine engine.

12. The aerofoil according to claim 11, wherein the aerofoil comprises an outlet guide vane of a gas turbine engine.

13. A gas turbine engine comprising the aerofoil in accordance with claim 1.

14. An aircraft comprising the aerofoil in accordance with claim 1.

* * * * *